United States Patent Office 3,088,281
Patented May 7, 1963

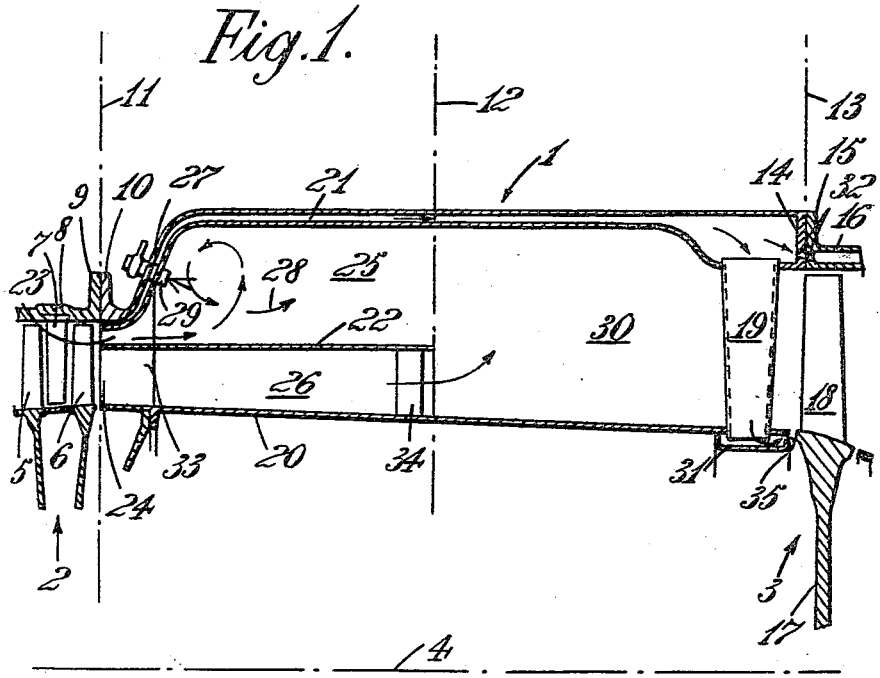

3,088,281
COMBUSTION CHAMBERS FOR USE WITH SWIRL-
ING COMBUSTION SUPPORTING MEDIUM
William Ernest Soltau and Peter Frederick Orchard,
Bristol, England, assignors, by mesne assignments, to
Bristol Siddeley Engines Limited, Bristol, England, a
British company
Filed Mar. 28, 1957, Ser. No. 649,124
Claims priority, application Great Britain Apr. 3, 1956
5 Claims. (Cl. 60—39.65)

This invention relates to the arrangement and construction of combustion chambers for use in combination with rotary machines such as compressors capable of discharging combustion-supporting medium (hereinafter referred to more shortly and without prejudice as "air") with a rotary swirl through an annular outlet.

For use in gas turbine engines comprising compressor systems of which the highest pressure stages are of the axial flow or centrifugal flow type it is known to provide a combustion chamber comprising inner and outer walls formed as surfaces of revolution about a common axis which will be coincident with the shaft axis of the engine. Such chambers have an entry portion which is initially divergent and an outlet portion which is finally convergent and contain a so-called flame-tube structure comprising walls which are spaced from the inner and outer walls and constrain part of the inflow of air to flow over the inner and outer walls. The flame-tube structure encloses a space into a first zone of which only sufficient air is admitted to produce turbulent flow conditions appropriate for the maintenance of stable combustion of fuel dispersed into the said zone and into a second zone of which additional air is admitted through openings in the flame-tube structure to mix with the products of combustion and thereby reduce their temperature to a value which the turbine structure can safely accept. It will be observed therefore that the combustion zone is positively separated by the flame-tube structure from the cooling or so-called dilution air flowing along the inner and outer walls towards the mixing zone and that mechanical means, namely openings in the flame-tube structure of suitable size and directive effect or guide members across which a pressure-drop is formed, are used to obtain mixing of the dilution air with the products of combustion entering the mixing zone from the combustion zone. Similar mechanical means are also frequently used to produce turbulence in the combustion zone.

Such combustion chambers furthermore comprise or are used in combination with a divergent diffusing passage leading from the outlet of the compressor to the inlet of the combustion chamber proper, and the compressor is provided with a stationary row of guide vanes to deflect the air, which is discharged from the last row of moving blades of the compressor with a substantial circumferential component, into the axial direction before it enters the diffusing passage.

The object of the present invention is to provide a simplified combustion chamber adapted for use without either a diffusing passage or a final row of stationary guide blades on the compressor or other rotary machine with which it is associated and which will therefore result in a substantial reduction in the length of the assembly as a whole. A further object of the invention is to reduce substanitally the need for mechanical mixing means. The elimination of such mixing means, guide blades and diffusing passage all tend to a reduction of pressure loss in the combustion equipment as a whole and therefore to an improvement in efficiency.

The invention consists in a combustion chamber comprising an entry portion and an outlet portion, the entry portion comprising inner and outer wall structures and an intermediate partition structure each formed as a surface of revolution about a common axis and forming between them at one end an axially directed inlet opening divided by said partition structure into annular parts of which the ratio of the cross-sectional area of the part lying inside the partition structure to the cross-sectional area of the part lying outside the partition structure is substantially equal to the required ratio of the mass flows of dilution air to combustion air, the outer wall structure and the partition structure diverging from one another in the direction of combustion air flow over at least a part of their length adjacent said inlet opening so as to reduce the speed and increase the turbulence of combustion air flowing therebetween sufficiently to form a zone wherein stable combustion may proceed, said partition structure extending only through said entry portion, and the outlet portion comprising inner and outer wall structures each constituting a continuation of the corresponding wall structure of the entry portion in a generally axial direction, and the combustion chamber also comprising means for dispersing fuel into that part of the entry portion lying between the outer wall structure and the partition structure, and a plurality of members extending between the inner and outer wall structures and the partition structure to provide mutual support for said structures, at least all such members extending between the inner wall structure and the partition structure being so shaped and arranged as to permit working medium approaching them with a swirling motion around said common axis to pass them without substantial straightening of said swirling motion towards the axial direction.

In operation, the whole or substantially the whole of the dilution air flows between the inner wall structure and the partition wall structure of the inlet portion of the combustion chamber with a maintained swirling motion and when it reaches the end of the partition structure it disperses outwardly under the action of centrifugal force into the less dense products of combustion coming from the combustion zone. The zone downstream of the end of the partition structure thus constitutes a mixing zone in which mixing can take place without the aid of mechanical directive devices.

According to a feature of the invention, said outer wall structure may be of double skin formation with a passage between the skins, which passage communicates with said inlet opening whereby air for cooling said structure may flow through said passage.

According to a further feature of the invention, the outlet portion of the combustion chamber may be formed to comprise an axially directed annular outlet opening, and a row of radially disposed guide blades may be provided extending between the inner and outer wall structures at said outlet, said guide blades being shaped to receive working medium coming from the mixing zone with a swirling motion and to modify the helix angle of the swirl.

Such modification of the helix angle may be in the sense of increasing or decreasing the amount of swirl and the action may be in one sense in certain operating conditions and in the other sense in other operating conditions. In some cases, as for example where the working medium discharged from the combustion chamber is to be used directly as a propulsive jet, the guide blades may be shaped to reduce the helix angle, as measured from the axial direction, substantially to zero.

Two embodiments of the invention will now be described, merely by way of example, with reference to the accompanying drawings, which show, somewhat diagrammatically, axial sections, on one side only of the axial center line, through combustion chambers in accordance with the invention and, in the case of FIGURE 1, adjacent parts of a compressor and a turbine, and, in the case of FIGURE 2, adjacent parts of a turbine only. Referring to FIGURE 1, the combustion chamber, which is annular, is indicated at 1, and has an axial center line 4. The combustion chamber forms part of a gas turbine engine. At the left hand side of the drawing are seen the last two moving blade rows 5 and 6 of an axial flow compressor 2 having an annular discharge outlet. One of the rows 7 of stator blades is also shown. It will be seen that the usual one or two rows of straightening blades following the last row of moving blades have been omitted, together with the usual divergent diffusing passage, and that the stator casing 8 is attached directly to the combustion chamber 1 by means of flanges 9 and 10. The combustion chamber may conveniently be regarded as comprising an entry portion included between the transverse planes 11 and 12 and an outlet portion included between the transverse planes 12 and 13.

At the plane 13 the combustion chamber 1 is connected by a flange 14 to a flange 15 on a stator casing 16 pertaining to the turbine 3, the turbine comprising a rotor disc 17 carrying blades 18. The working fluid passing through the combustion chamber is directed on to the blades 18 by a row of nozzle guide blades 19 which are permanently attached to the combustion chamber so as to form a single unit.

The entry portion of the combustion chamber comprises an inner wall structure 20, an outer wall structure 21 and an intermediate partition structure 22 each formed as a surface of revolution about the axial center line 4. These three structures form between them at the end plane 11 of the combustion chamber an axially directed inlet opening divided by the partition structure into an outer annular part 23 and an inner annular part 24. The air entering the inlet part 23 constitutes combustion air, while the air entering the part 24 constitutes dilution air, consequently the ratio of the cross-sectional areas of the parts 24 and 23 has to be chosen to provide the required ratio of the mass flows of the dilution air to the combustion air, this ratio depending upon the permissible maximum temperature of the working medium entering the moving blades 18 of the turbine 3 shown on the right hand side of the drawing. The ratio of the areas will be approximately the same as the ratio of the mass flows but may differ therefrom to an extent sufficient to compensate for differences in the flow coefficients of the two parts of the entry portion of the combustion chamber, namely the outer combustion zone 25 and the inner dilution air passage 26.

To reduce the speed and increase the turbulence of the combustion air entering through the inlet part 23 with a substantial swirling motion around the axis 4, a part 27 of the outer wall structure adjacent the inlet diverges sharply from the partition structure 22 in the direction of flow of the combustion air. The enlarged space thus formed constitutes the combustion zone 25. A toroidal vortex rotating about the axis 4 is formed in the combustion zone 25 by the inflowing air, as indicated by the arrows 28, and fuel is dispersed into this vortex by any suitable means. In the example shown in the drawing, liquid fuel is dispersed into the vortex by a number of atomizing spray burners of which one is shown at 29. Alternatively, vaporizing burners of known type may be used, or the fuel may be dispersed into the air flowing into the inlet part 23 in the form of spray or vapor through openings in the last row of moving blades 6 of the compressor. Ignition means, not shown, are also provided for igniting the fuel in the combustion zone.

The outlet portion of the combustion chamber comprises inner and outer wall structures which are continuations in a generally axial direction of the wall structures 20 and 21 of the entry portion and are, therefore, not separately referenced. These wall structures enclose between them a mixing zone 30 which is not divided by a continuation of the partition structure 22. Dilution air flows into the mixing zone 30 through the passage 26 of the entry portion with a maintained swirling motion around the axis 4, and being denser than the hot products of combustion entering the mixing zone from the combustion zone 25 is dispersed through these products by the effect of centrifugal force without the need for any mechanical mixing devices. The mixed gases then pass between the guide blades 19 and are directed on to the moving blades 18 of the turbine. Since the gases arriving at the guide blades 19 still have a substantial swirling component of motion around the axis 4, it will be appreciated that the guide blades 19 need only produce a smaller angle of deflection than is the case when working with combustion chambers from which the working medium is discharged in the axial direction.

Since the inner wall structure 20 and the partition structure 22 are swept over on one side by the relatively cool dilution air, no great problems of overheating occur and these structures may be composed at least for the most part of single sheet metal skins. The outer wall structure 21 is, however, exposed to the hot combustion gases over practically the whole of its length and will require to be made either of a highly refractory material of good heat insulation qualities or else to be of double-skin construction, for example as shown in the drawing, with provision for a flow of cooling air between the skins. The passage between the skins is shown as communicating with the inlet opening for entry of cooling air, and after this air has passed over the inner skin of the outer wall structure it is conveyed through the guide blades 19, which are made hollow for this purpose, into an annular collector 31 from which it is discharged downstream over the root portions of the moving blades 18 of the turbine through openings 35. Part of the cooling air may also be discharged downstream through openings 32 in the flanges 14 and 15 into the stator casing 16, formed as a double skinned structure.

At the entry end of the combustion chamber and the inner and outer wall structures and the partition structure are interconnected for mutual support by a ring of members in the form of vanes 33 spaced around the chamber. These vanes extend between the inner and outer wall structures and are disposed helically so that the air discharged with a swirling motion from the compressor can pass them without the swirling motion being substantially straightened towards the axial direction. It is to be understood that the helix angle of the swirling air leaving the compressor will vary with the rotational speed of the compressor and that it will be necessary to make a compromise selection of the angle at which the vanes 33 are set, this selection aiming to provide under all operating conditions sufficient swirl of the dilution air to effect thorough mixing of this air with the products of combustion in the mixing zone. The parts of the vanes 33 extending between the outer wall structure 21 and the partition structure 22 are preferably set at the same angle as the parts extending between the inner wall structure 20 and the partition structure 22, but the maintenance of circumferential swirl in the dilution air passage 26 is regarded as of more importance than the establishment or maintenance of such swirl in the combustion zone 25. The downstream end of the partition structure 22 is connected to the inner wall structure 20 by a ring or similar vanes 34, and similar considerations apply in the selection of the helix angle at which these vanes are set. At the outlet end of the combustion chamber the guide blades 19 provide the necessary structural interconnection between the inner and outer wall structures.

In a modification, either or both the partition structure 22 and the inner skin of the outer wall structure 21 may be provided with holes for the admission of secondary combustion air into the combustion zone 25 and these openings may have a directive effect upon the air passing through them so as to assist the formation of the desired toroidal vortex motion of the air in the combustion zone. In this case the cross-sectional area of the part 23 of the inlet opening would, of course, be correspondingly reduced.

Combustion chambers according to the invention may be used for reheating working medium discharged from a gas turbine. FIGURE 2 shows such a combination. the combustion chamber has a construction similar to that described with reference to FIGURE 1, and corresponding parts are indicated by the same reference numerals as are used in FIGURE 1.

The turbine comprises a rotor disc 17 carrying a single row blades 18 as before, and the blades 18 are designed to discharge working medium expanding through the turbine with a sufficiently pronounced swirling motion to permit the combustion chamber to operate in the manner previously described. The turbine has an annular exhaust outlet, and the combustion chamber has its inlet opening connected thereto so as to receive directly the swirling exhaust from the turbine. The outlet blades 19' of the combustion chamber, in the present case, are so disposed that the working medium is discharged from the chamber in an axial direction. The outlet opening of the combustion chamber shown in FIGURE 2 is circular instead of annular, that is to say the inner wall structure 20 is of generally conical formation with the apex 40 of the cone facing downstream.

We claim:

1. A combustion apparatus having an annular combustion chamber for use with combustion supporting medium having substantial components of velocity in both the axial and circumferential directions, comprising an entry portion having inner and outer wall structures each formed as a surface of revolution about a common axis and forming between them at one end an axially directed annular inlet opening to the combustion chamber, means for swirling the combustion supporting medium round said common axis and directly discharging said combustion supporting medium while so swirling into said entry portion, a partition structure for said entry portion formed as a surface of revolution about said common axis, the partition structure extending only through said entry portion and dividing said annular inlet into inner and outer annular parts of which the ratio of the cross-sectional area of the annular part lying inside the partition structure to the cross-sectional area of the annular part lying outside the partition structure is substantially equal to the required ratio of the mass flows of dilution air to combustion air, said outer wall structure and the partition structure diverging from one another in the direction of combustion air flow over at least a part of their length adjacent said inlet opening so as to reduce the speed and increase the turbulence of combustion air flowing therebetween sufficiently to form a zone wherein stable combustion may proceed, means for dispersing fuel into said stable combustion zone, an outlet portion having inner and outer wall structures each constituting a continuation of the corresponding wall structure of the entry portion in a generally axial direction, and a plurality of support members connecting together the partition structure and the inner and outer wall structures of the entry portion, at least those of said support members which extend across the passage between the inner wall structure of the entry portion and the partition structure having a shape which will allow swirling working medium to pass them without substantial alteration of the helix angle of the swirl.

2. In a gas turbine engine the combination of a combustion chamber as claimed in claim 1, with an axial flow gas turbine designed to exhaust with a rotary swirl round the axis of rotation of the gas turbine through an annular exhaust outlet, the combustion chamber being connected to receive through its said annular inlet opening the exhaust from the annular exhaust outlet of the turbine.

3. A combustion apparatus as claimed in claim 1 wherein said first-mentioned means is a bladed compressor having the last row of compressor blades rotatable and located at the point of discharge close to and next adjacent said inlet portion.

4. Combustion apparatus comprising means imparting to an annular stream of air axial velocity and circumferential swirl round the axis of the annular stream, a combustion chamber comprising an entry portion arranged for direct reception of said swirling air, said entry portion having inner and outer concentric tubular wall structures forming between them an axially directed annular inlet opening at one end and an axially directed annular outlet opening at the other end, a concentric tubular partition extending only through said entry portion so that air entering said inlet will be divided into outer and inner annular swirling streams, said outer wall structure enlarging suddenly downstream of said inlet so that the whole of said outer annular stream is caused to form a toroidal vortex in the space between the enlarged part of said outer wall structure and said partition, means for dispersing fuel into said space for combustion with said toroidal vortex of air and thus form a zone of combustion therein, and an outlet portion having inner and outer wall structures constituting respectively continuations of the inner and outer wall structures of said entry portion in a generally axial direction, said outlet portion enclosing a mixing zone in which said swirling inner annular stream, having passed the downstream end of said partition, can disperse outwardly into products of combustion guided in a generally axial direction from said zone of combustion by said partition and said outer wall structures.

5. In a gas-turbine engine having a rotary compressor which is provided with an air inlet and an annular air outlet and which is adapted to discharge through said outlet compressed air having substantial components of velocity in both an axial direction and a direction around the axis of said annular air outlet; combustion equipment comprising coaxial inner and outer wall structures forming between them at one end an entry portion having an axially directed annular inlet opening which is directly connected to the outlet of the compressor to receive the air having said substantial components of velocity as discharged from the compressor, a tubular partition which is disposed between and coaxially with said inner and outer wall structures and is supported from at least one of said wall structures and which extends only through said entry portion so that air entering said inlet will be divided into outer and inner annular swirling streams, said outer wall structure enlarging suddenly downstream of said inlet so that the whole of said outer annular stream is caused to form a toroidal vortex in the space between the enlarged part of said outer wall structure and said partition, means for dispersing fuel into said space for combustion with said toroidal vortex of air thus forming a zone of combustion therein, and an outlet portion having inner and outer wall structures constituting respectively continuations of the inner and outer wall structures of said entry portion in a generally axial direction, said outlet portion enclosing a mixing zone in which the swirling inner annular stream, having passed the downstream end of said partition, can disperse outwardly into products of combustion guided in a generally axial direction from said zone of combustion by said partition and said outer wall structures.

References Cited in the file of this patent

UNITED STATES PATENTS

| 2,243,467 | Jendrassik | May 27, 1941 |
| 2,326,072 | Seippel | Aug. 3, 1943 |
| 2,477,683 | Birmann | Aug. 2, 1949 |
| 2,603,949 | Brown | July 22, 1952 |
| 2,625,793 | Mierley et al. | Jan. 20, 1953 |

(Other references on following page)

UNITED STATES PATENTS

| | | | |
|---|---|---|---|
| 2,630,678 | Pratt | Mar. 10, | 1953 |
| 2,646,664 | Meschino | July 28, | 1953 |
| 2,687,010 | Ellis | Aug. 24, | 1954 |
| 2,696,709 | Oulianoff | Dec. 14, | 1954 |
| 2,935,840 | Schoppe | May 10, | 1960 |

FOREIGN PATENTS

| | | | |
|---|---|---|---|
| 847,530 | Germany | Aug. 25, | 1952 |
| 850,969 | Germany | Sept. 29, | 1952 |
| 666,062 | Great Britain | Feb. 6, | 1952 |
| 210,655 | Switzerland | Oct. 16, | 1940 |